(12) United States Patent
Aerts et al.

(10) Patent No.: US 9,505,963 B2
(45) Date of Patent: Nov. 29, 2016

(54) MEMBRANE BASED ON A BINDER COMPOUND WITH TALL-OIL PITCH

(75) Inventors: Hans Aerts, Lot (BE); Nicolas Martin, Lot (BE); Michel Zwijsen, Perwez (BE); Eric Bertrand, Perwez (BE); Renaud Verdebout, Perwez (BE)

(73) Assignee: S. A. Imperbel N.V., Lot (BE)

( * ) Notice: Subject to any disclaimer, the term of this patent is extended or adjusted under 35 U.S.C. 154(b) by 1049 days.

(21) Appl. No.: 13/164,921

(22) Filed: Jun. 21, 2011

(65) Prior Publication Data

US 2012/0071597 A1 Mar. 22, 2012

(30) Foreign Application Priority Data

Jun. 22, 2010 (BE) .................... 2010/0370

(51) Int. Cl.
| | |
|---|---|
| C08K 5/52 | (2006.01) |
| C09J 193/04 | (2006.01) |
| C08L 93/04 | (2006.01) |
| E04C 2/28 | (2006.01) |
| E04D 5/06 | (2006.01) |
| E04D 5/10 | (2006.01) |
| C08L 95/00 | (2006.01) |

(52) U.S. Cl.
CPC .............. *C09J 193/04* (2013.01); *C08L 93/04* (2013.01); *E04C 2/28* (2013.01); *E04D 5/06* (2013.01); *E04D 5/10* (2013.01); *C08L 95/00* (2013.01); *C08L 2205/02* (2013.01)

(58) Field of Classification Search
CPC ......................................................... C08L 95/00
USPC ...................................... 524/59, 71, 72, 270
See application file for complete search history.

(56) References Cited

U.S. PATENT DOCUMENTS

| | | | |
|---|---|---|---|
| 4,242,245 A | * | 12/1980 | Allison, III ................... 524/423 |
| 5,473,000 A | | 12/1995 | Pinomaa |
| 2007/0043198 A1 | * | 2/2007 | Madaj .............................. 528/44 |
| 2008/0060551 A1 | * | 3/2008 | Crews et al. ................. 106/277 |
| 2010/0025625 A1 | * | 2/2010 | Swift et al. .................. 252/88.1 |
| 2010/0147190 A1 | * | 6/2010 | Naidoo et al. ................ 106/229 |
| 2010/0190892 A1 | | 7/2010 | Binkley |

FOREIGN PATENT DOCUMENTS

| | | |
|---|---|---|
| GB | 2057912 | 4/1981 |
| GB | 2058610 | 4/1981 |
| WO | WO 03/048264 | 6/2003 |
| WO | WO 2006/107179 | 10/2006 |
| WO | WO 2009/071653 | 6/2009 |

* cited by examiner

*Primary Examiner* — Wenwen Cai
(74) *Attorney, Agent, or Firm* — Jacobson Holman PLLC

(57) ABSTRACT

Membrane based on a binder compound with tall-oil pitch Membrane produced on the basis of a binder compound comprising a crude tall-oil pitch in a quantity of 1-65 w. %, more specifically a quantity of 20-55 w. %, even more specifically a quantity of 36-55 w. %, and a polymer in a quantity of 7-40 w. %, more specifically in a quantity of 8-20 w. %, even more specifically in a quantity of 9-17 w. %, and a filler.

15 Claims, No Drawings

MEMBRANE BASED ON A BINDER COMPOUND WITH TALL-OIL PITCH

The invention relates to a membrane produced on the basis of a binder compound comprising tall-oil pitch and a polymer.

Such binder compound can be used for example to produce environmentally friendly roof covering membranes and carpet backings. The term "membrane" in this description of the invention refers to both a membrane for roof covering and a membrane intended for carpet backing.

Crude tall-oil is a waste stream from the wood industry, in particular the paper industry. It is amongst other a by-product of pulping mainly of conifers and is composed amongst others from resins, non-saponifiable sterols, resin acids, fatty acids, fatty alcohols, sterols and other alkyl-hydrocarbon derivatives. Distillation of crude tall-oil causes this to fraction into tall-oil resins and tall-oil amongst others. The base fraction or residue of the distillation is called crude tall-oil pitch (CTO pitch) and contains mainly compounds with a high boiling point and high molecular weight which are formed amongst others as a result of the high temperatures during the fractioning process. Crude tall-oil pitch is typically a mixture of fatty acids, esterified fatty acids, resin acids and non-saponifiable constituents.

Traditionally bitumen is regarded as a waste product of the petrochemical industry which constitutes a cheap and high quality raw material for the production of roof covering membranes, carpet backings or asphalt. Due to rising demand for mineral oil products for use in the chemical industry and as a fuel, the availability of high quality bitumen has diminished greatly, while the price has increased. Thus what was still regarded as a waste product just a few years ago is now used as a source of further useful substances, which means that the quality of what is now regarded as waste has diminished. In addition the use of bituminous products has a harmful effect on the environment because its production places great pressure on the environment. Another disadvantage of the use of bitumen is the acidification of rain water as a consequence of interaction of UV light with bitumen.

U.S. Pat. No. 5,473,000 describes a binder compound which comprises bitumen, tall-oil pitch and an elastomer. The disadvantage of this compound is that the quantity of bitumen is very high as it amounts to at least 55 w. % bitumen.

US-PS 2010/0190892 describes a binder compound which consists of tall-oil pitch and an elastomer. A disadvantage of this compound without bitumen is however that the weight ratio of elastomer to tall-oil pitch is low, namely 0.16. The bonding between the elastomer and the tall-oil pitch is therefore inadequate, in particular if the binder compound is used in roof covering membranes. Compounds with a higher weight ratio of elastomer to tall-oil pitch however also contain asphalt which makes them less suitable for use in an environmentally-friendly membrane.

The object of the invention is to produce a membrane in which alternatives to bitumen are sought, in order thus to substantially reduce the quantity of bitumen required for production of a membrane, preferably to less than 50 w. %.

A membrane according to the invention is thus produced on the basis of a binder compound comprising a crude tall-oil pitch in a quantity of 1-65 w. %, more specifically in a quantity of 20-55 w. %, even more specifically in a quantity of 36-55 w. %, and a polymer in a quantity of 7-40 w. %, more specifically in a quantity of 8-20 w. %, even more specifically in a quantity of 9-17 w. %, and a filler. By use of this binder compound, a membrane is obtained which has similar properties to existing membranes produced on the basis of bitumen. Such a membrane offers the advantage that for the binder compound, no bitumen or much less bitumen based on crude oil is required to obtain water-tightness properties. Thus a membrane is obtained which is more environmentally friendly than the existing membranes based on bitumen. Another important advantage is that the problem of acid leaching from bitumen, which can lead to acidified rain water, is substantially reduced as the quantity of bitumen is substantially less or even totally non-existent. Recovered rain water can consequently be used with less treatment for sanitary or other applications. Another advantage is that roof covering membranes and carpet backings which contain the binder compound according to the invention can be handled, fitted and used in the same way as existing roof covering membranes and carpet backings.

The use of crude tall-oil pitch offers an ecological benefit because this uses a waste stream as a renewable material, also called a "second generation renewable raw material". In addition crude tall-oil pitch as a "second generation renewable raw material" is also ecologically more responsible than a "first generation" renewable raw material because it is not in competition with the food chain.

Thanks to the interaction between the crude tall-oil pitch and the polymer in the concentration ranges given, the binder compound acquires sufficient viscosity, namely a viscosity of 1,400 to 35,000 Pa.s at 180° C., rendering it suitable for production of membranes. This viscosity value is also similar to the viscosity value of bituminous binder compounds. At ambient temperature the binder compound will be solid, whereby a solid membrane is obtained. At temperatures up to 50° C. the binder compound also remains cohesive and consequently will not flow, which again is favourable in use in membranes.

A first preferred embodiment of a membrane according to the invention is characterised in that in the binder compound, the ratio of polymer to crude tall-oil pitch is greater than 0.18, more specifically between 0.2 and 0.4, even more specifically between 0.2 and 0.3. Thanks to the interaction between the crude tall-oil pitch and the polymer in these concentration ranges, the binder compound also acquires a very low melting temperature, namely 100 to 180° C. In this temperature range the binder compound acquires a certain degree of plasticity as defined in the trade by technical standard ASTM D36/D36M-09 of Dec. 15, 2009. The binder compound must be able to become sufficiently plastic, when for example it forms part of a roof covering membrane that is applied by flame welding to a substrate or surface, to thereby achieve a good adhesion of the roof covering membrane to the substrate. For flame welding typically a flame is used with a flame temperature of 180° C. to 220° C. With this melting temperature the membrane according to the invention will already become sufficiently plastic in a range of 100 to 180° C., in contrast to bituminous binder compounds which typically have a higher melting temperature, namely higher than 180° C., whereby flame welding requires less energy, which protects the environment and saves costs.

Thanks to the interaction between the polymer and the crude tall-oil pitch in the ratio of greater than 0.18, the binder compound acquires sufficient stability, cohesion and cold flexibility. Cold flexibility is defined in the trade as the temperature in (° C.) at which breakage of the roof covering membrane occurs on flexion. A cold flexibility at temperatures below −15° C. has the advantage that even at extremely low ambient temperatures, for example down to −25° C., no breakage of the membrane will occur. This applies both to a freshly produced membrane and to an aged membrane e.g. after a life of twenty years during which great fluctuations in the ambient temperature have occurred. Sufficient cold flexibility will for example also allow a product, e.g. a roof covering membrane, in which the binder compound is present, to be rolled up at an ambient temperature of −25° C. e.g. for stacking, storage or transport, and then unrolled again or applied without breakages occurring in the binder compound.

The binder compound may eventually also contain bitumen in a quantity of maximum 40 w. %. Bitumen acts as a filler and gives the binder compound a certain hardness and viscosity. By the addition of a maximum bitumen quantity of 40 w. %, a binder compound is obtained which contains more renewable raw materials and is more environmentally friendly than existing binder compounds.

A roof covering membrane produced with the binder compound according to the invention has favourable properties such as e.g. good handling and ease of working, and furthermore can be rolled up or laid, is crack free, and remains stable even if the binder compound reaches a low temperature e.g. −25° C. In winter the binder compound which forms part of such roof covering membranes will consequently not tend to break or crack.

Such roof covering membranes are ecologically responsible as less non-renewable $CO_2$ occurs because the raw materials are largely renewable. In addition such roof covering membranes are halogen-free and 100% recyclable. They can be attached in combination with a cold adhesive according to the present invention, which creates an ecological roof covering.

More details and particularities of the invention will be explained in the description given below.

The membrane according to the invention is produced by using a binder compound which contains a crude tall-oil pitch in a quantity of 1-65 w. %, more specifically in a quantity of 20-55 w. %, even more specifically in a quantity of 36-55 w. %. This crude tall-oil pitch, also called tall-oil tar, offers the advantage that it has good and sustained interaction with a polymer so that a cohesive whole is obtained. The quantity of polymer is 7-40 w. %, more specifically a quantity of 8-20 w. %, even more specifically a quantity of 9-17 w. %. At the selected quantities the crude tall-oil tar will not leach or leak out of the binder compound. Possible polymers are preferably selected from the group comprising styrene-butadiene-styrene (SBS), styrene-ethylene-butene-styrene (SEBS), styrene-isoprene-styrene (SIS), polyisobutylene (PIB), polyhydroxybutyrate, polyolefins, polyvinylbutyral (PVB), atactic polypropylene (APP) and isotactic polypropylene (IPP), and combinations thereof. Furthermore the binder compound also contains a filler. SBS is a suitable choice in binder compounds because it mixes well during the production of the binder compound and gives the best result in relation to cold flexibility, liquefaction properties and viscosity. Examples of polyolefins which are used as a polymer in the binder compound are polyethylene and polypropylene.

Preferred examples of crude tall-oil pitch are for example Tallex® by MeadWestvaco®, Fortop® by van Forchem Oy and tall-oil pitch from DRT®.

It must be noted that US 2010/0190892 describes a binder compound based on CTO pitch and an elastomer, also a sealing material consists of this binder compound and $CaCO_3$ as filler in a 1:1 ratio. This binder compound however contains 86 w. % CTO pitch and 13.7% polymer whereby the softening point of the sealing material is 85° C., which is too low for use in the production of a membrane. In this binder compound the ratio of polymer to crude tall-oil pitch is 0.16, which is too low for the production of a membrane. As a result this compound has a tendency to melt at a temperature above 85° C., whereby this compound is less suitable for use as a membrane on roofs which are exposed to high temperatures as a result of solar heat. Also the cold flexibility is insufficient, namely at a temperature below 15° C., and accelerated ageing of the membrane will occur, whereby the quality of the fitted membrane will rapidly diminish.

Preferably for production of the membrane according to the invention a binder compound is used which contains a ratio of polymer:CTO pitch or polymer:CTO pitch and additives which is greater than 0.18, more specifically between 0.2 and 0.4 and even more specifically between 0.2 and 0.3. The use of polymers in the binder compound in the given ratio to CTO pitch will ensure that a good cold flexibility, good liquefaction properties and good viscosity are obtained. At a ratio of polymer:CTO pitch or polymer:CTO pitch and additives which is less than 0.18, the mixture will have less cold flexibility so that the membrane can already break at temperatures below −15° C., whereas if the ratio is greater than 0.4 there is a chance that too much polymer is present, whereby the viscosity at 180° C. increases greatly and higher temperatures will be required (>220° C.) to produce the membrane, whereby degradation of certain components can occur and the quality of the binder compound will diminish greatly. At this temperature above 220° C., due to degradation the viscosity of the compound will diminish greatly, reducing the flexibility of the membrane.

The binder compound can be completely free from bitumen or eventually comprises a limited quantity of bitumen as a filler, namely maximum 40 w. %, more specifically 0.1-30 w. %, even more specifically 0.5-10 w. %. The addition of bitumen has no effect on the properties of the binder compound while the cost price of the binder compound is reduced as a result.

The binder compound used for production of the membrane can furthermore contain resin as an additive in a quantity of 0.1-20 w. %, more specifically in a quantity of 6-14 w. %, even more specifically in a quantity of 9-13 w. %. The resin is not however necessary, in contrast to the description of U.S. Pat. No. 5,473,000, to achieve a coherent whole, but the adhesion of the binder compound to the surface will be strengthened.

As a resin both natural and synthetic resins can be used. Examples of natural resins are gum resin and derivatives of gum resin such as esters of gum resin, esters of dehydrogenated gum, resin esters of stabilised gum resin, esters of resin acids, esters of stabilised resin acids, esters of polymerised gum resin, phenolically modified ester of gum resin, pentaerythritol ester of gum resin, triethylene-glycol ester of gum resin, ethylene-glycol ester of gum resin, dibasic acid modified gum resin, resin oil, cardanol or other products derived from oil of cashew nut shells (CNSL or cashew nut shell liquid), furan resins and products derived from furan resin. Synthetic resins can be both amorphous and crystalline.

With a ratio of polymer:tall-oil pitch and resin greater than 0.18, more specifically between 0.2 and 0.4 and even more specifically between 0.2 and 0.3, not only is the adhesion to the surface where the membrane is applied stronger but also good cold bending of the membrane is achieved (<−15° C.) while good viscosity is obtained, namely from 1,400 to 35,000 Pa.s at 180° C.

The binder compound preferably also comprises an antioxidant e.g. a phenolic antioxidant suitable for preventing oxidation of the binder compound, more specifically the polymer in combination with the resin. On use of an antioxidant, the viscosity and cohesion of the binder compound will be retained over time. In a further preferred embodiment the binder compound comprises an antioxidant in a quantity of maximum 4 w. %, more specifically 0.1-3 w. %, even more specifically 0.5-1.5 w. %.

Preferably the binder compound contains a filler in a quantity of less than 65 w. %, more specifically in a quantity of 20-50 w. %, even more specifically in a quantity of 32-40 w. %. This higher content of filler then usual in conventional bitumen binder compounds can be used thanks to the good cold flexibility of the binder compound and also entails an economic benefit. All fillers for use in bitumen-based binder compounds can be used in the binder compound according to the present invention. Examples of fillers are talcum, $CaCO_3$, sand, silica, rock meal, fly ash, limestone meal, calcium hydrate, organic filler such as meal, flour, sawdust. The filler ensures amongst others that the binder compound is less sticky. In addition the filler is usually the cheapest component which makes the binder compound economically advantageous.

As a filler in the binder compound it is also possible to use a flame retarder such as for example ATH (aluminium trihydrate) or colemanite, whereby the membranes obtained are more fire-resistant.

In another preferred embodiment the binder compound comprises colouring or colourings e.g. organic or inorganic pigments i.e. $TiO_2$, $Fe_2O_3$, whereby the binder compound can assume a colour depending on the choice of colouring or colourings.

It is furthermore possible to add additives to the binder compound. Such an additive is for example lignin which is a complex chemical molecule usually derived from wood and the wood industry. Lignin can be extracted via various processes during pulping of paper. The lignin is for example but not limited to lignin from the sulphite process and lignin from the sulphate process. The lignin ensures that in a membrane according to the invention, the effect of ageing on the flexibility at low temperature diminishes greatly. In a further preferred embodiment the binder compound comprises lignin in a quantity of maximum 40 w. %, more specifically 0.1-30 w. %, even more specifically 0.5-20 w. %.

A further additive is for example lecithin which is a natural phospholipid that occurs in the cell wall of plants. Lecithin is a by-product from the production of vegetable oils such as linseed oil, olive oil etc. Lecithin facilitates the dispersion of the polymer in the binder compound, whereby in the present invention the effect of ageing on the flexibility at low temperature diminishes greatly. In a further preferred embodiment the binder compound comprises lecithin in a quantity of maximum 30 w. %, more specifically 0.1-20 w. %, even more specifically 0.1-10 w. %.

Some examples are summarised below of a binder compound for production of a membrane according to the invention.

EXAMPLE 1

Ingredients (w. %) of a binder compound with CTO pitch and modified resin and its physical properties.

|  | % |
| --- | --- |
| Crude tall-oil pitch | 38.9 |
| Modified colophan resin | 11.1 |
| SBS | 13.5 |
| Antioxidant | 3.2 |
| $CaCO_3$ | 8.9 |
| $TiO_2$ | 3.7 |
| $Fe_2O_3$ | 0.7 |
| Colemanite | 20 |
| Polymer:CTO + resin | 0.27 |
| Viscosity 180° C. (Pa · s) | 24088 |
| Flexibility new (° C.) | −35 |
| Flexibility 28 days 70° C. (° C.) | −25 |
| Peel test (N/5 cm) | 154 |
| Melting temperature (° C.) | 140 |
| Softening point (° C.) | 91-113 |
| PEN 60° C. (1/10 dm) | 116 |

EXAMPLE 2

Ingredients (w. %) and physical properties of binder compounds without resin as additive

|  | % |
| --- | --- |
| Crude tall-oil pitch | 50.7 |
| Modified colophan resin | 0 |
| SBS | 12.4 |
| Antioxidant | 2.1 |
| $CaCO_3$ | 8 |
| $TiO_2$ | 4.2 |
| $Fe_2O_3$ | 0.8 |
| Colemanite | 21.8 |
| Polymer:CTO + resin | 0.24 |
| Viscosity 180° C. (Pa · s) | 12018 |
| Flexibility new (° C.) | −35 |
| Flexibility 28 days 70° C. (° C.) | −40 |
| Peel test (N/5 cm) | 106 |
| Melting temperature (° C.) | 150 |
| PEN 60° C. (1/10 dm) | 166 |
| Softening point (° C.) | 91-108 |

EXAMPLES 3 AND 4

Ingredients (w. %) and physical properties of binder compounds–influence of the ratio of polymer:CTO+resin

|  | % | % |
| --- | --- | --- |
| Crude tall-oil pitch | 26 | 26 |
| Modified colophan resin | 26 | 26 |
| SBS | 10 | 10 |
| Antioxidant | 1 | 1 |
| $CaCO_3$ | 15 | 35 |
| $TiO_2$ | 4.5 | 4.5 |
| $Fe_2O_3$ | 0.5 | 0.5 |
| Colemanite | 20 | 0 |
| Polymer:CTO + resin ratio | 0.19 | 0.19 |
| Viscosity 180° C. (Pa · s) | 19700 | 14000 |
| Flexibility new (° C.) | −8 | −8 |
| Flexibility 28 days 70° C. (° C.) | 0 | −2 |
| Peel test (N/5 cm) | N/A | N/A |
| Melting temperature (° C.) | N/A | N/A |
| PEN 60° C. (1/10 dm) | 81 | 102 |
| Softening point (° C.) | 107-120 | 99-133 |

EXAMPLES 5, 6 AND 7

|  | % | % | % |
|---|---|---|---|
| Crude tall-oil pitch | 39.3 | 40.8 | 41.7 |
| Modified colophon resin | 11.3 | 11.7 | 12 |
| SBS | 13.7 | 10.4 | 8.5 |
| Antioxidant | 3 | 3.1 | 3.2 |
| $CaCO_3$ | 10.5 | 10.9 | 11.1 |
| $TiO_2$ | 1.4 | 1.5 | 1.4 |
| $Fe_2O_3$ | 0.5 | 0.5 | 0.5 |
| Colemanite | 20.3 | 21.1 | 21.5 |
| Polymer:CTO + resin ratio | 0.27 | 0.20 | 0.16 |
| Viscosity 180° C. (Pa · s) | 17040 | 5930 | 2100 |
| Flexibility new (° C.) | −29 | −24 | −13 |
| Flexibility 28 days 70° C. (° C.) | −26 | −16 | −6 |
| Peel test (N/5 cm) | N/A | N/A | N/A |
| Melting temperature (° C.) | N/A | N/A | N/A |
| PEN 60° C. (1/10 dm) | 100 | 132 | 180 |
| Softening point (° C.) | 134 | 128 | 113 |

As can be established from example 7 (third column), at a ratio of polymer:CTO and resin of 0.16, the value of the flexibility is very low in relation to values obtained at a ratio of more than 0.18, both with regard to the new value and that after 28 days.

COMPARATIVE EXAMPLES 8, 9 AND 10

Ingredients (w. %) and physical properties of a binder compound–influence of additives such as lignin, lecithin and IPP.

|  | % | % | % |
|---|---|---|---|
| Crude tall-oil pitch | 39.3 | 39.3 | 39.3 |
| Modified colophon resin | 9.6 | 5.65 | 0 |
| Lignin | 1.7 | 5.65 | 11.3 |
| SBS | 13.7 | 13.7 | 13.7 |
| Antioxidant | 3 | 3 | 3 |
| $CaCO_3$ | 10.5 | 10.5 | 10.5 |
| $TiO_2$ | 1.4 | 1.4 | 1.4 |
| $Fe_2O_3$ | 0.5 | 0.5 | 0.5 |
| Colemanite | 20.3 | 20.3 | 20.3 |
| Polymer:CTO + resin + lignin | 0.27 | 0.27 | 0.27 |
| Viscosity 180° C. (Pa · s) | 9120 | 14070 | 19560 |
| Flexibility new (° C.) | −42 | −44 | −52 |
| Flexibility 28 days 70° C. (° C.) | −38 | −42 | −46 |
| Peel test (N/5 cm) | N/A | N/A | N/A |
| Melting temperature (° C.) | N/A | N/A | N/A |
| PEN 60° C. (1/10 dm) | 186 | 184 | 148 |
| Softening point (° C.) | 90-108 | 92-107 | 91-105 |

EXAMPLES 11, 12 AND 13

|  | % | % | % |
|---|---|---|---|
| Crude tall-oil pitch | 38.3 | 34.3 | 29.3 |
| Modified colophon resin | 11.3 | 11.3 | 11.3 |
| Lecithin | 1 | 5 | 10 |
| SBS | 13.7 | 13.7 | 13.7 |
| Antioxidant | 3 | 3 | 3 |
| $CaCO_3$ | 10.5 | 10.5 | 10.5 |
| $TiO_2$ | 1.4 | 1.4 | 1.4 |
| $Fe_2O_3$ | 0.5 | 0.5 | 0.5 |
| Colemanite | 20.3 | 20.3 | 20.3 |
| Polymer:CTO + resin | 0.28 | 0.30 | 0.34 |
| Viscosity 180° C. (Pa · s) | 16415 | 17950 | 19940 |
| Flexibility new (° C.) | −42 | −44 | −52 |
| Flexibility 28 days 70° C. (° C.) | −38 | −40 | −46 |
| Peel test (N/5 cm) | N/A | N/A | N/A |
| Melting temperature (° C.) | N/A | N/A | N/A |
| PEN 60° C. (1/10 dm) | 151 | 148 | 158 |
| Softening point (° C.) | 114 | 115 | 119 |

EXAMPLE 14

Influence of IPP

|  | % | % |
|---|---|---|
| Crude tall-oil pitch | 45.8 | 45.8 |
| Modified colophan resin | 0 | 0 |
| IPP | 0 | 21 |
| SBS | 15 | 14.7 |
| Antioxidant | 3.3 | 3.2 |
| $CaCO_3$ | 11.5 | 11.3 |
| $TiO_2$ | 1.5 | 1.5 |
| $Fe_2O_3$ | 0.5 | 0.5 |
| Colemanite | 22.3 | 21.8 |
| Polymer:CTO + resin | 0.33 | 0.33 |
| Viscosity 180° C. (Pa · s) | 11000 | 17870 |
| Flexibility new (° C.) | −37 | −36 |
| Flexibility 28 days 70° C. (° C.) | −35 | −36 |
| Peel test (N/5 cm) | N/A | N/A |
| Melting temperature (° C.) | N/A | N/A |
| PEN 60° C. (1/10 dm) | 142 | 151 |
| Softening point (° C.) | 107 | 102 |

The invention claimed is:

1. Membrane produced on the basis of a binder comprising in the absence of bitumen a crude tall-oil (CTO) pitch in a quantity of 1-65 w. %, a polymer in a quantity of 7-40 w. %, a filler, and one or more additives selected from the group consisting of a resin, lignin, and lecithin, wherein the ratio of polymer to crude tall-oil pitch and the one or more additives is between 0.18 and 0.4, wherein the polymer is selected from the group consisting of styrene-butadiene-styrene(SBS), styrene-ethylene-butene-styrene (SEBS), styrene-isoprene-styrene (SIS), polyisobutylene (PIB), polyhydroxybutyrate, polyolefins, polyvinylbutyral(PVB), atactic polypropylene (APP), and isotactic propylene (IPP), and combinations thereof, and wherein the resin is selected from the group consisting of gum resin, esters of gum resin, esters of dehydrogenated gum resin, esters of stabilized gum resin, esters of resin acids, esters of stabilized resin acids, esters of polymerized gum resin, phenolically modified ester of gum resin, pentaerythritol ester of gum resin, triethylene-glycol ester of gum resin, ethylene-glycol ester of gum resin, dibasic acid modified gum resin, resin oil, cardanol, other derivatives from oil of cashew nut shells, furan resin, and furan resin derivatives.

2. Membrane according to claim 1, wherein the filler quantity is 20 to 50 w. %.

3. Membrane according to claim 1, wherein the polymer is a styrene-butadiene-styrene polymer.

4. Membrane according to claim 1, wherein the binder further comprises an antioxidant in a quantity of 0.1-4 w. %.

5. Membrane according to claim 1, wherein the one or more additives is a resin in a quantity of 6-20 w. %.

6. Membrane according to claim 5, wherein the resin is a natural resin.

7. Membrane according to claim 5, wherein the resin is a synthetic resin.

8. Membrane according to claim 1, wherein the one or more additives is lignin in a quantity of 0.5-40 w. %.

9. Membrane according to claim 1, wherein the one or more additives is lecithin in a quantity of 0.1-30 w. %.

10. Membrane according to claim 1 wherein the quantity of crude tall-oil pitch is 20-55 w. % and the quantity of polymer is 8-20 w. %.

11. Membrane according to claim 1, wherein the filler quantity is 30 to 40 w. %.

12. Membrane according to claim 1, wherein the ratio of polymer to crude tail-oil pitch and one or more additives is between 0.2 and 0.3.

13. Membrane according to claim 1, wherein the filler quantity is 20 to 50 w. %.

14. Membrane according to claim 1, wherein the filler quantity is 30 to 40 w. %.

15. Membrane according to claim 1, wherein the binder further comprises an antioxidant in a quantity of 0.5-4 w. %.

\* \* \* \* \*